United States Patent [19]

Houston

[11] Patent Number: 4,843,398

[45] Date of Patent: Jun. 27, 1989

[54] TRACKING RADAR SYSTEM

[75] Inventor: William Houston, Chelmsford, England

[73] Assignee: The Marconi Company Limited, Chelmsford, England

[21] Appl. No.: 178,854

[22] Filed: Aug. 5, 1980

[30] Foreign Application Priority Data

Aug. 7, 1979 [GB] United Kingdom ............... 7927496

[51] Int. Cl.⁴ ............................................. G01S 13/68
[52] U.S. Cl. ........................................ 347/74; 342/75
[58] Field of Search ................................ 343/7 A, 7.4; 342/73–75

[56] References Cited

U.S. PATENT DOCUMENTS 3,160,880 12/1964 Aires ..................................... 343/7.4
3,432,854 3/1969 Stillwell .................................. 342/74

Primary Examiner—T. H. Tubbesing
Attorney, Agent, or Firm—Spencer & Frank

[57] ABSTRACT

In a tracking radar system target glint and multipath sometimes produce signals which falsely indicate high acceleration rates of the target. These signals cause the boresight of the antenna to be driven away from the direction in which the target actually lies.

To avoid this problem, received signals from a receiver are fed through a switch which is opened whenever the target appears to have an acceleration or velocity above a threshold value. The threshold value is varied so that the proportion of the time during which the switch is open is kept approximately constant. Thus, if there is a period during which a large number of high acceleration or high velocity signals appear from the receiver (for example is there is a very high noise level) the switch still remains closed for a certain proportion of the time period. This ensures that the tracking system never loses the target while also ensuring that false tracking due to target glint and multipath is minimized.

A circuit is included so that, when the switch is open the antenna is not brought to a complete halt but rather is allowed to continue to move in the direction that it was moving before the switch was operated.

10 Claims, 1 Drawing Sheet

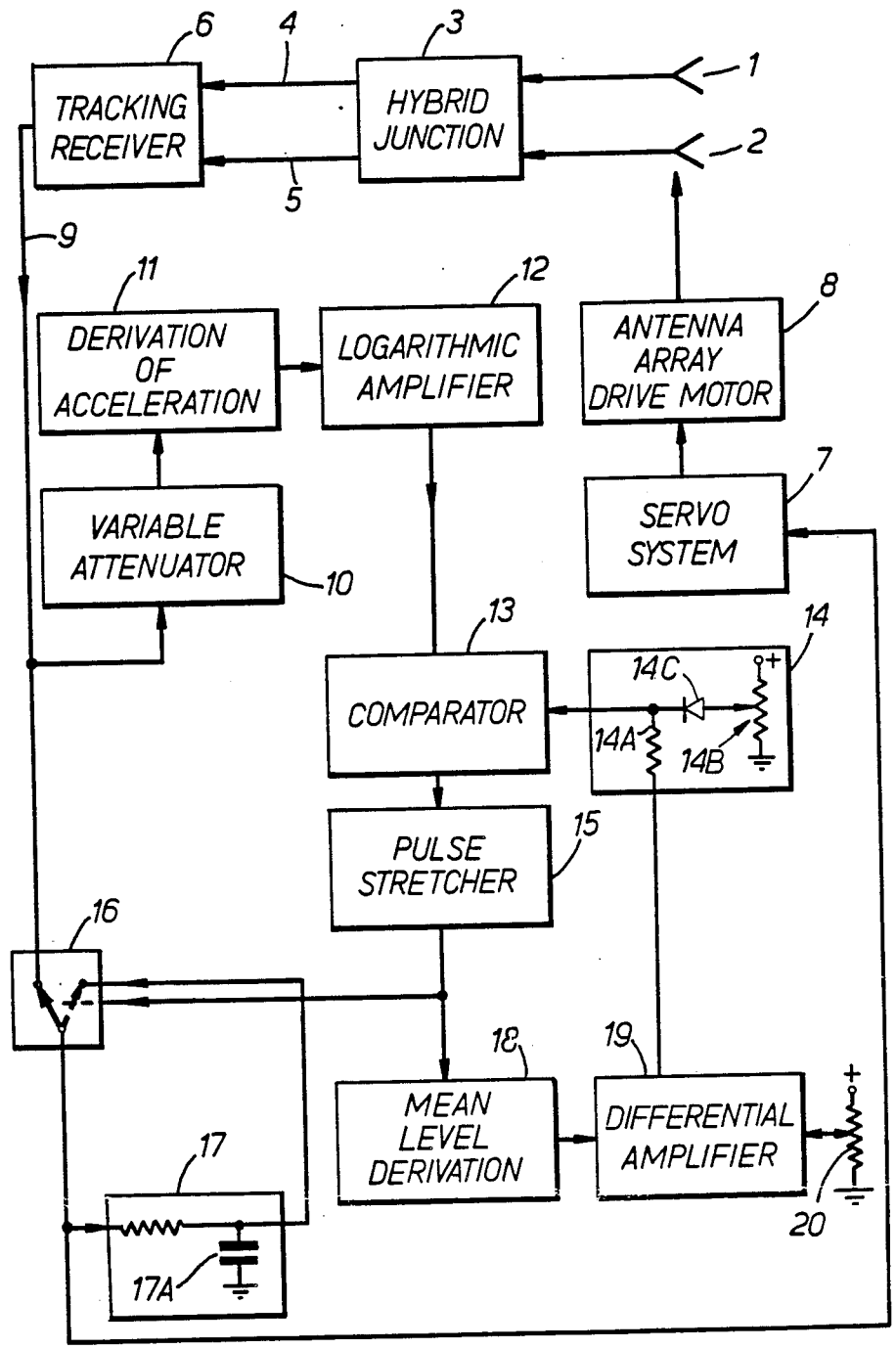

TRACKING RADAR SYSTEM

BACKGROUND OF THE INVENTION

This invention relates to a tracking radar system having: an antenna with at least one direction of maximum gain, hereinafter called the boresight; means for producing signals indicating an angular difference between the direction of a target and the boresight; and means for changing the boresight in response to the said signals so as to tend to reduce that difference.

Radar systems as described above suffer from a problem in that the aforementioned signal may sometimes indicate short term changes in the angular position of the target, which changes do not actually occur. This is because of (a) target "glint", i.e. changes in the reflection properties of the target as it changes in attitude; (b) "multipath" which is the existance of two paths for the transmission of signals to the target and/or reflection of signals from the target (this can be caused for example by reflection off the sea surface); and (c) thermal noise generated within the receiving circuit.

SUMMARY OF THE INVENTION.

This invention provides a tacking radar system having: an antenna with at least one boresight; means for producing signals indicating an angular difference between the direction of a target and the said boresight; means for changing the said boresight in response to the said signals so as to tend to reduce that difference; control means for preventing the said boresight changing in response to signals indicating that a function of the velocity of the target (i.e. the angular velocity or acceleration) is greater than a threshold; and means for varying the threshold so as to tend to keep constant the proportion of a time period during which the threshold is exceeded.

It has been found that the signals arising from the aforementioned glint, multipath and thermal noise give rise to false received signals which are characteristic of target velocites or accelerations much greater than the maximum velocity or acceleration which is possible in practice for a real target. Thus, by preventing the boresight changing in response to signals indicating an angular velocity or acceleration greater than the threshold, it is possible to prevent inaccuracies which would otherwise occur.

If a fixed threshold were to be set, a problem would arise when the noise level were particularly high. Such particularly high noise levels occur from time to time in any receiver where automatic gain control is used. With a low input signal, the amplification factor is high and the noise is therefore correspondingly high. In such circumstances the aforementioned "control means" would operate constantly in response to the thermal noise: resulting in the system losing track of the target. A similar problem would arise in circumstances where target glint or multipath is very severe. In order to avoid this difficulty the invention provides means for varying the threshold so as to tend to keep constant the proportion of a time period during which the threshold is exceeded.

It would be possible to arrange for movement of the boresight to be prevented during periods when the threshold is exceeded. However, if the target can be assumed always to be moving, it is better to arrange for the boresight to continue to move in the direction in which it was moving before the threshold was exceeded.

BRIEF DESCRIPTION OF THE DRAWING

The accompanying single schematic drawing shows a tracking radar system constructed in accordance with the invention.

DESCRIPTION OF THE PREFERRED EMBODIMENT

The illustrated monopulse tracking radar has antenna array feed horns 1, 2 (only two of which are shown) connected to a hybrid junction 3 comprised by a magic-T. Sum and difference output channels 4, 5 from the hybrid junction 3 are connected to an angle tracking receiver 6 known per se. Because such tracking receivers are well known, see for example "Introduction to Radar Systems" by M.I. Skolnik, a detailed description of the construction and operation of such a receiver is not given here. It is sufficient to say that, at the output of the tracking receiver 6 appears a signal representative of the boresight error angle or the rate of change of the boresight error angle of the antenna array with respect to the position of a target.

In a conventional monopulse tracking radar, the output of a tracking receiver like that shown at 6 is connected to a servo-system like that shown at 7, which is utilized to apply appropriate signals to a drive motor like that shown at 8, so that the antenna array boresight is adjusted in a way which tends to minimize the error angle.

In the illustrated ciruit the output 9 from the receiver 6 is passed through an attenuator 10 which can be a simple potential divider to a circuit 11 which produces an output representing the angular acceleration of the target relative to the boresight. The purpose of the attenuator 10 is to match the signal to the dynamic range of the circuit 11. The circuit 11 would thus include a differentiator if the output 9 of the receiver 6 represents the rate of change of the angular error; or it would include a double differentiator if the output of receiver 6 represented the error angle. It is pointed out that if a signal representing velocity, rather than acceleration, is required the circuit 11 will be replaced by a single differentiator if the output of receiver 6 is error angle, or will be omitted if the output of receiver 6 is angular velocity. The output of the circuit 11 is full wave rectified by means (not shown) to obtain a unidirectional signal.

In the illustrated embodiment the dynamic range of the output of the circuit 11 is compressed by a logarithmic amplifier 12 (to make the system more sensitive to small signals than to large signals) and is then compared in a comparator 13 with a threshold value received from a circuit 14 (which will be described later). If the threshold is exceeded it is assumed that there is a high probability that the signal at the output of receiver 6 contains faulty information due to target glint or multipath. The comparator 13 then produces an output pulse beginning at the time the threshold is crossed and ending when it is crossed again. The duration of this pulse is slightly extended in a pulse stretching circuit 15 which delays the trailing edge of the pulse by a fixed amount. This extended pulse is an inhibiting pulse which causes switch 16 to assume a blanking condition indicated in broken lines on the drawing thereby preventing signals from circuit 6 altering the boresight of the antenna. However, it is not desired that the existance of an inhibiting pulse at the output of circuit 15 bring the boresight movement to a complete halt. It is better that the boresight continue to move in the way in which it was moving before a pulse was generated by comparator 13. The output of the receiver 6 is therefore stored by the capacitor 17a within a low pass filter circuit 17. When the switch 16 assumes the condition indicated in broken lines the stored value is applied to the servo-system 7 so as to continue to move the boresight in the same way as it was moving before the switch 16 was operated.

The inhibiting pulses from circuit 15, these pulses being of constant amplitude but of varying duration, are also passed to a low pass circuit 18 (similar to circuit 17) which produces an analog output voltage whose value is proportional to the mean level of the input pulses over a given time period long enough to include a plurality of inhibiting pulses. The output of circuit 18 is therefore dependent on the proportion of the said time period that inhibiting pulses are present, i.e. is proportional to the probability of blanking applied by switch 16.

The analog output voltage from circuit 18 is compared, in a differential amplifier 19, with a set voltage level defined by the position of adjustment of a variable resistor 20. The output of the differential amplifier 19 represents the difference between its inputs and adjusts the threshold via resistor 14A of circuit 14 so as to lower this threshold if there are insufficient threshold crossings to allow the mean value of the stretched pulses (as defined by the output of circuit 18) to be as large as the voltage defined at 20 and vice versa. The effect of the loop formed by circuits 13, 15, 18, 19 and 14 is to adjust the threshold so that inhibiting pulses open the switch 16 for an approximately constant proportion of the time however seriously the output from the receiver 6 may be affected by target glint or multipath or thermal noise. This action may be overridden by circuit 14 which is arranged so as to prevent the threshold from being adjusted down to the value of angular acceleration which could be achieved by a real target. This is done by a potential divider 14B and a diode 14C which define a lower limit to the threshold value.

I claim:

1. A tracking radar system having: an antenna with at least one boresight; means for producing signals indicating an angular difference between the direction of a target and the said one boresight; means for changing said boresight in response to the said signals so as to tend to reduce the difference; control means for preventing said boresight responding to signals indicating that a function of the velocity of the target is greater than a threshold; and means for varying the threshold thereby tending to keep constant the propostion of a time period during which the threshold is exceeded.

2. A tracking radar system according to claim 1 wherein said control means includes means responsive to the threshold being exceeded, for causing the boresight to continue to move in a direction in which it was moving before the threshold was exceeded.

3. A tracking radar according to claim 1 or 2 wherein said control means includes circuit means for determining angular acceleration as said function of the velocity.

4. A tracking radar according to claim 1 or 2 wherein said control means includes circuit means for determining angular velocity as said function of the velocity.

5. In a tracking radar system including an antenna with at least one boresight, first means for producing output signals indicating an angular difference between the direction of a target and said one boresight, and second means, connected to the output of said first means and responsive to said output signals, for changing the position of said one boresight so as to tend to reduce said difference; the improvement comprising: third means response to said output signals for determining whether said output signals indicate that a function of the velocity of the target is greater than a threshold value; control means, responsive to an ouput signal from said third means indicating that said threshold value is being exceeded, for preventing said second means from responding to said output signals from said first means; and fourth means for varying said threshold value so as to tend to keep constant the proportion of a time period during which said threshold value is exceeded.

6. A tracking radar system as defined in claim 5, further comprising fifth means, actuated upon receipt by said control means of an output signal from said third means that said threshold value is being exceeded, for supplying a signal to said second means to cause said one boresight to continue to move in the same direction.

7. A tracking radar system as defined in claim 5 or 6 wherein said control means includes a switch means for connecting said second means to the output of said first means, when in a normal first condition and for disconnecting said first and second means when in a second condition.

8. A tracking radar system as defined in claim 7 wherein said fifth means includes storage means, connected to the input of said second means, for storing the output signal of said first means when said switch means is in said first condition and for supplying its stored value to said second means when said switch means is in said second condition.

9. A tracking radar system as defined in claim 5 wherein said third means includes circuit means for determining the angular acceleration of a target from said output signals of said first means, and comparator means for comparing a signal corresponding to said angular acceleration with said threshold value and for producing an output signal whenever said threshold value is being exceeded.

10. A tracking radar system as defined in claim 5 wherein said third means includes circuit means for determining the angular velocity of a target from said output signals of said first means, and comparator means for comparing a signal corresponding to said angular velocity with said threshold value and for producing an output signal whenever said threshold value is being exceeded.

* * * * *